United States Patent [19]
Soan
[11] Patent Number: 4,965,508
[45] Date of Patent: Oct. 23, 1990

[54] POWER SUPPLY CIRCUIT HAVING CONTROLLABLE THYRISTOR NETWORK AND ADJUSTABLE VOLTAGE REGULATOR

[75] Inventor: Basil Soan, Crawley, Great Britain
[73] Assignee: APV UK Limited, Great Britain

[21] Appl. No.: 327,528
[22] Filed: Mar. 23, 1989

[30] Foreign Application Priority Data

Mar. 29, 1988 [GB] United Kingdom ................. 8807529

[51] Int. Cl.[5] ........................ G05F 1/253; G05F 1/455
[52] U.S. Cl. .................................... 323/239; 323/258; 323/263; 323/324; 323/342
[58] Field of Search ............... 323/237, 239, 255, 256, 323/257, 258, 259, 263, 320, 324, 340, 342, 343, 344

[56] References Cited

U.S. PATENT DOCUMENTS 3,189,816 6/1965 Brozek ............................... 323/256
3,287,624 11/1966 Perry .................................. 323/256
3,601,686 8/1971 Gautherin ........................... 323/258
4,286,207 8/1981 Spreadburry et al. ............. 323/263
4,454,466 6/1984 Ritter ................................. 323/258

FOREIGN PATENT DOCUMENTS 0026866 4/1981 European Pat. Off. .
2375755 7/1978 France .

*Primary Examiner*—Peter S. Wong
*Attorney, Agent, or Firm*—Thomas E. Sisson

[57] ABSTRACT

A load is supplied by a transformer supplied via a voltage regulator and thyristor network. The thyristor network and regulator are simultaneously controlled to respond to changes in the load and in practice the thryistors respond rapidly and are re-adjusted as the regulator is inherently more slowly adjusted. The result is that the thyristors produce minimum reflected harmonics overall in the mains and an optimum power factor can be achieved for each power setting.

7 Claims, 1 Drawing Sheet

POWER SUPPLY CIRCUIT HAVING CONTROLLABLE THYRISTOR NETWORK AND ADJUSTABLE VOLTAGE REGULATOR

BACKGROUND OF THE INVENTION

The invention relates to electrical power supply circuits.

There is often a need to control the power supplied to an electrical load especially if the power has to be limited or varied in accordance with operating requirements. The present invention has been developed to control the power being supplied to an ohmic heater, such as described in UK Patent Specification 2068200, but can be used for supplying a wide variety of electrical loads. In many cases the supply must be controlled to respond quickly and evenly to changes and also to comply with various regulations of power utility companies so as not to interfere with the power being supplied to other consumers from the same mains supply by the generation of unacceptable harmonics in the mains power supply.

SUMMARY OF THE INVENTION

According to the present invention an alternating current power supply circuit for a variable electrical load comprises a power transformer having a secondary winding for connection to the load, an adjustable voltage regulator connected to the primary winding of the transformer, and a controllable thyristor network for supplying the primary winding. A load responsive circuit is arranged to provide control signals to both control operation of the thyristor network and to adjust the regulator in a manner to tend to maintain the thyristors of the thyristor network in their conducting states for a predetermined maximum period of each cycle of respective half-wave voltage of the incoming supply so that overall inherent harmonic reflections are kept to a minimum.

DETAILED DESCRIPTION OF THE PREFERRED EMBODIMENT

Figure 1:
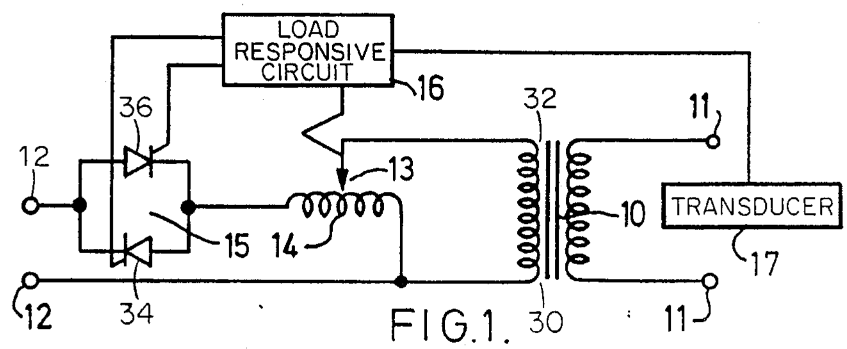
FIG. 1 is a supply circuit diagram of the present invention.

Referring to FIG. 1, a power transformer 10 has terminals 11 on its secondary winding for connection to a variable electrical load. The primary winding is connected at a first end 30 to a mains supply terminal 12 and at a second end 32 to a movable sliding contact 13 on a voltage regulator 14, in the form of an autotransformer arrangement. The regulator 14 is connected between the output side of a thyristor network 15 and the mains supply terminal 12. A load responsive circuit 16 is connected to receive signals from a load sensing transducer 17 and arranged in use in response to signals from the transducer 17 to vary the operation of the thyristors 34 and 36 and simultaneously to adjust the position of the contact 13.

The described circuit of FIG. 1 is arranged to vary the supply to alter the output of the transformer 10 as the load or the requirement for supplying the load varies. For example, in a food processing plant as described in UK Patent Specification No. 2068200, the flow rate of the medium being processed and its temperatures are continuously monitored by one or more transducers and the output of the transformer 10 varied to keep the effective amount of heating of the medium within a desired predetermined range. The overall control made possible by use of the described circuit enables the inherent rapid response of the thyristor circuit to be used to make rapid adjustments for any rapidly required changes in the power output of the transformer 10. This is in contrast, certainly, to the inherently much slower response of the described regulator 14 which incorporates mechanical moving parts. However, by using the regulator 14 to vary the primary voltage, the thyristors can be maintained to turn on always in each cycle close to the zero crossings of the mains voltage so that resultant harmonics generated in the system are always of low power.

Clearly, the thyristors must always be turned on somewhat after the crossing, even when a supposed optimum adjustment for any load, to allow the control circuit to respond to all changes in the load, that is changes in both directions, as required.

In practice, the control circuit is arranged to simultaneously and continuously control the operation of the thyristor circuit 14 and the movement of the contact 13 to achieve the best conditions for minimum power harmonic generation and maximum power factor. This can be achieved for example by making, when necessary, immediate changes to the output of the transformer 10 using the facility of rapidly changing the effecting mark space ratio of conduction of the thyristors. However, the control circuit is arranged to also adjust, but inherently more slowly, the regulator 14 to alter the primary voltage in response to this load change while controlling the mark space ratio to compensate for the regulator alterations as the contact 13 is moved. Thus, for example, if the load reduces, the power can be rapidly reduced by delaying the switch-on of the thyristors and then as the regulator reduces the voltage the thyristors are progressively switched on earlier until the optimum balance is achieved for the new lower load conditions.

Figure 2:
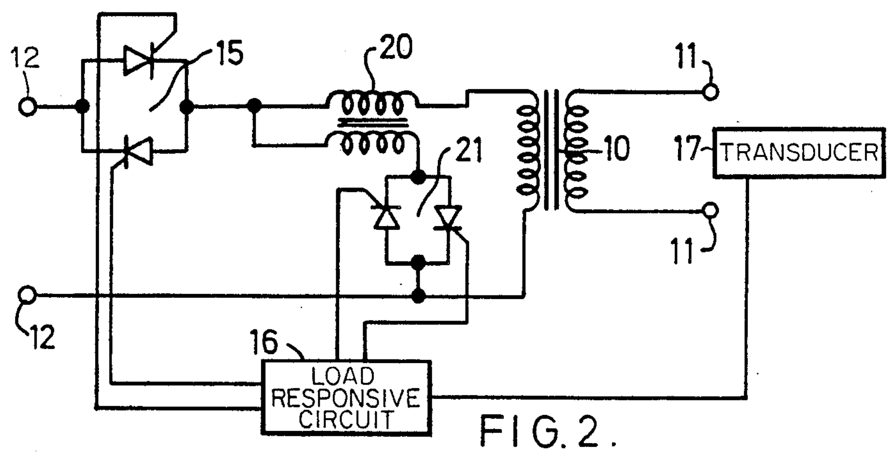
FIG. 2 is a circuit diagram of the present invention with an auxiliary transformer supplied by a second thyristor network.

In FIG. 2, the supply circuit is generally the same and controlled in a similar manner to the supply circuit in FIG. 1 except the voltage regulator is in the form of an auxiliary transformer 20 supplied by a second thyristor network 21. The load sensing circuit in FIG. 2 controls the operation of both thyristor networks 15 and 21 simultaneously.

Figure 3:
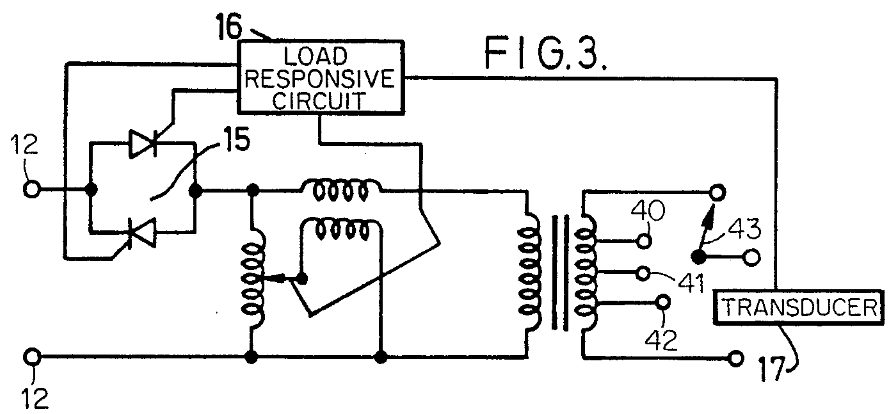
FIG. 3 is a circuit diagram of the present invention with a main transformer having secondary taps and a tapping switch.

In FIG. 3 the supply circuit is generally the same and controlled in a similar manner to the supply circuit in FIG. 1 and the auxiliary transformer 20 and thyristor network 21 as in FIG. 2, but in this circuit the main transformer has secondary taps 40, 41, 42, and a tapping switch 43. The taps are arranged for load impedance ranges. With this system the auxiliary transformer and its thyristor primary control are considerably reduced in rating and hence size because the range of control can be much reduced by selecting the correct tap in anticipation or precalibration of the overall load to be supplied by the circuit.

It is possible to place the thyristor network between the voltage regulator and the transformer primary winding although simultaneous control of the thyristor network and regulator is then somewhat more complex in practice.

While the invention has been described in connection with a preferred embodiment, it is not intended to limit the invention to the particular form set forth, but, on the contrary, it is intended to cover alternatives, modifications, and equivalents, as may be included within the spirit and scope of the invention as defined by the appended claims.

I claim:

1. An alternating current power supply circuit for a variable electrical load comprising a power transformer having a secondary winding for connection to said load, and a primary winding connected to a main power supply via an adjustable voltage regulator, a thyristor network in series with said adjustable voltage regulator, said thyristor network having thyristors which are arranged to be conducting for a predetermined maximum period of each cycle of said main power supply, and a load responsive circuit arranged to provide control signals to control said adjustable voltage regulator, and switching of said thyristors in said thyristor network, said load responsive network being arranged to adjust relatively immediately said switching of said thyristors in response to changes in said load and subsequently adjusting said adjustable voltage regulator and said thyristor switching in combination to return said thyristors to said predetermined condition.

2. The invention of claim 1 wherein said voltage regulator further comprises a slidable contact.

3. The invention of claim 1 wherein said voltage regulator further comprises an auxiliary transformer supplied in use by a second thyristor network.

4. The invention of claim 1 wherein said power transformer is provided with a tapped secondary winding.

5. The invention of claim 2 wherein said power transformer is provided with a tapped secondary winding.

6. An alternating current power supply circuit for a variable electrical load comprising:

a power transformer having a secondary winding for connection to said load and a primary winding connected to a main power supply through an auxiliary transformer;

a first thyristor network in series with said auxiliary transformer, said thyristor network having thyristors which are arranged to be conducting for a predetermined maximum period of each cycle of said main supply;

a load responsive circuit arranged to supply control signals to control said auxiliary transformer and to control switching of said thyristors in said thyristor network;

a second thyristor network being provided in series between said load responsive circuit and said auxiliary transformer, switching of thyristors in said second thyristor network being controlled to adjust said auxiliary transformer and said power transformer;

said load responsive circuit controlling switching of said thyristors in said first and said second thyristor networks to adjust the power supplied to said load.

7. An alternating current power supply for a variable electrical load comprising:

a power transformer having a secondary winding for connection to said load and a primary winding connected to a main power supply through an auxiliary transformer;

a thyristor network in series with said auxiliary transformer, said thyristor network having thyristors which are arranged to be conducting for a predetermined maximum period of each cycle of said main supply; and a load responsive circuit arranged to supply control signals to control said auxiliary transformer and to control switching of said thyristors in said thyristor network, said load responsive network being arranged to adjust relatively immediately said switching of aid thyristors in response to changes in said load and subsequently adjusting said auxiliary transformer and said thyristor switching in combination to return said thyristors to said predetermined condition.

* * * * *